Dec. 31, 1935.  H. H. SEMMES ET AL  2,025,909
AIRPLANE INDICATOR
Filed March 27, 1930.
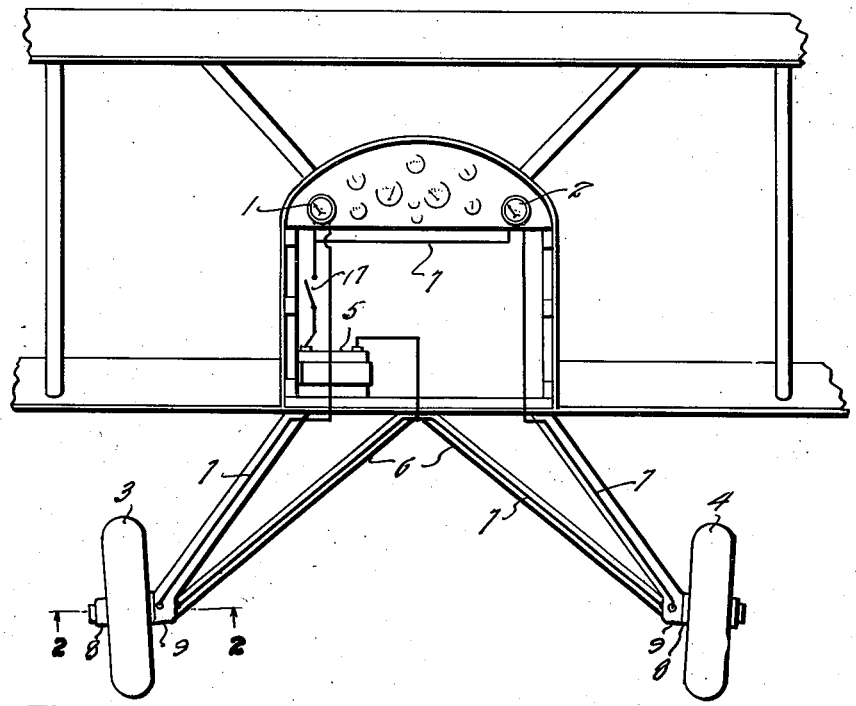
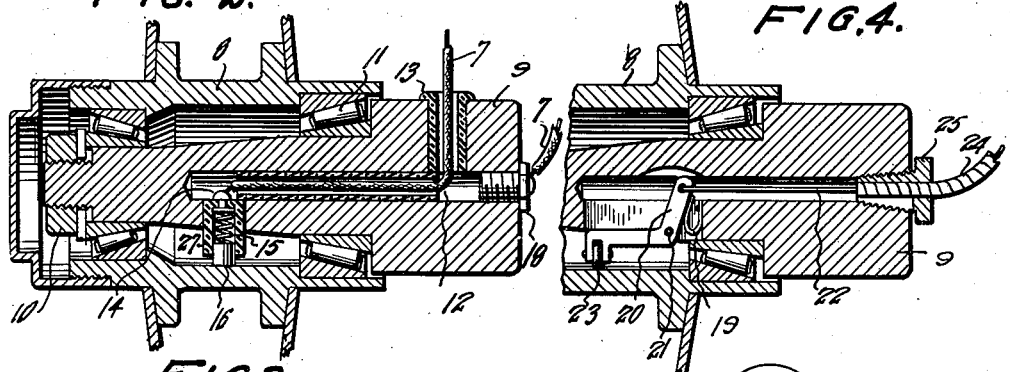
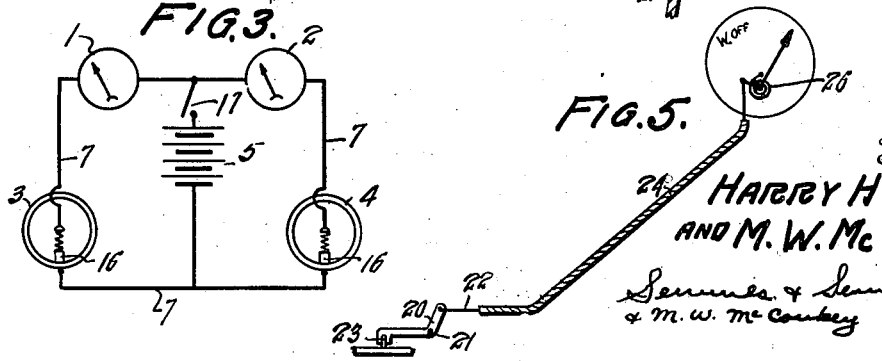
Inventor
HARRY H SEMMES
AND M. W. McCONKEY
Semmes & Semmes
& M. W. McConkey
Attorneys Patented Dec. 31, 1935

2,025,909

UNITED STATES PATENT OFFICE 2,025,909

AIRPLANE INDICATOR

Harry H. Semmes, Chevy Chase, Md., and Montgomery W. McConkey, South Bend, Ind., assignors to Bendix Aviation Corporation, South Bend, Ind., a corporation of Delaware Application March 27, 1930, Serial No. 439,501

3 Claims. (Cl. 177—311)

This invention relates to safety appliances for airplanes and more particularly to a method of and apparatus for indicating the presence of a wheel on the landing gear of an airplane.

Heretofore, no device has been installed on airplanes which would indicate when one or both of the wheels had either been broken off in ascending or fallen after in the air. Numerous accidents have occurred due to the pilot's ignorance of such a condition, which is not apparent, in view of his inability to see the landing gear. The seriousness of these accidents could unquestionably have been minimized if the pilot of the plane only had some knowledge of the mishap. This is particularly advantageous when a pilot is landing at some distant airport. Instances have occurred where a wheel of an airplane had fallen off and the pilot was warned of his misfortune by others at the same field. However, in landing at a distant field, this necessary warning could not be given in time to avoid a serious accident.

It is an object of this invention to provide an indicator which discloses the loss of an airplane part.

It is another object of this invention to provide an electrical indicator which will advise the pilot of any mishap in his landing gear.

Yet another object of this invention is to provide a mechanical indicator showing the mishap.

Still another object is to provide a method of indicating any landing gear mishap.

With these and other equally important objects in view, the invention comprehends the provision of an electrical circuit and a mechanical device in or on the airplane for indicating when a wheel of an airplane has broken loose and fallen from its axle.

In accordance with the present invention, there are shown suitable indicators mounted within view of the pilot and connected electrically through the wheels of an airplane so that upon the loss of a wheel, the indicating device is actuated. There are also shown mechanical means for accomplishing the same purpose.

In order to make our invention more clearly understood, we have shown, in the accompanying drawing, means for carrying the same into practical effect without limiting the improvements in their useful applications to the particular constructions which, for the purpose of explanation, have been made the subject of illustration.

In the drawing:

Figure 1 is a part cross-sectional view of an airplane showing the general arrangement of the wires and indicators.

Figure 2 is a cross-sectional view taken along the line 2—2 of Fig. 1 showing the electrical circuit applied to the wheel axle of an airplane landing gear.

Figure 3 is a diagrammatic drawing of the electrical circuit.

Figure 4 is a cross-sectional view taken along the line 2—2 of Fig. 1 showing the mechanical means for carrying out the present invention.

Figure 5 is a diagrammatic representation of the mechanical indicating means.

Referring to Figure 1, indicators 1 and 2 are located in a convenient position on the dash board of a plane. These indicators are connected to the battery 5 and wheels 3 and 4 of the landing gear 6, as shown diagrammatically in Figure 3. The wiring 7 connecting the wheels 3 and 4 to the battery 5 is run preferably through the supports of the landing gear and should be insulated. It is to be understood, however, that the wiring may be located in any convenient place.

The wheels 3 and 4 are mounted on the hub 8 which is secured to the axle 9 by a suitable locking nut 10. Positioned between the hub of the wheel 8 and the axle 9 are roller bearings 11. The insulated wire 7 is run through a suitable passage 12, preferably lined with an insulating material 13 to a position in the axle where it can be secured by means of a suitably constructed contact 14. Positioned directly below and in contact with the lower part of the bolt is a spring 15 kept in position by a plunger 16 resting against the inner surface of the hub of the wheel 8. The spring and plunger are housed in an insulated passage 27, the reasons for which will hereinafter appear.

It will be appreciated that, if desired, the electrical wiring associated with the wheel does not necessarily have to be located as indicated and it is to be clearly understood that the present invention comprehends the broad conception of an electrical tell-tale device associated with the wheels. The electric wires may, for instance, be placed in proper grooves located on the outside of the axle of the wheel and may be attached to the axle by any suitable means.

The electrical circuit is completed through the hub of the wheel 8 which is in metallic contact with the plunger 16 and the axle 9. At the innermost point on the axle, an insulated wire 7 is secured to the axle of the wheel by a suitable nut 18. This wire is run through or on any convenient place on the landing gear support to the battery.

The switch 17, located at a suitable place for the pilot, can either be left open or closed. When the switch is in the closed position, there should be a steady deflection of the needle on each of the indicators informing the pilot that his wheels are still in place and nothing has happened to his landing gear supports.

When a wheel of the landing gear falls off and the switch 17 is in a closed position, the needle on the indicator will not show any deflection. The electrical circuit is thereby broken, since in falling off the wheel carries with it the hub 8, allowing the plunger 16 and spring 15 to drop out. The housing 21 is insulated and the lower position of the contact 14 is not in contact with any current carrying metal. If the switch 17 is open and is only closed when the plane is being placed in a position for landing, no deflection of the needle will be noted on the indicator when a wheel has come off.

When the switch 17, as shown in Figure 3, is in a closed position and the left wheel 3 falls off, the left indicator will fail to show any deflection. The right indicator 2 will however continue to deflect since the circuit on the right side of the airplane has not been broken. Thus by having a separate circuit for each wheel, the loss of either or both will be apparent. Manifestly the selective indication may be secured when employing a system in which the circuit is made by removal of a part.

It is obvious from the foregoing disclosure that those skilled in the art can provide suitable means for making the electrical circuit and it is to be clearly understood that the scope of the present invention comprehends both making and breaking the circuit.

In Figures 4 and 5, there is shown one embodiment of mechanically indicating when a wheel has fallen off. The wheel in its departure from the plane will carry with it, the hub 8 as has been mentioned hereinbefore. In the mechanical indicator, this will cause the spring 19 of any suitable construction to exert an actuating force on the rocker or double arm lever 20, fixed at 21 by suitable means, not shown. Connected to the upper end of the rocker lever 20, is a tension element such as a flexible wire or any other suitable material 22 which is attached to the needle of the indicator. At the other end of the lever, there is located a suitable anti-friction means 23, offering the least amount of resistance when the hub of the wheel is properly functioning with the axle. The wire is preferably run through a flexible conduit 24 to prevent catching and enters the axle of the wheel through an aperture in a nut 25. The actuating force exerted by the spring 19 causes the rocker lever 20 to partially revolve around the fixed point 21. The movement of the rocker lever causes the wire in the conduit to actuate the spring 26 of the indicator.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. In combination with an airplane having a landing gear and wheels, an axle supporting the wheel and provided with an aperture, a crank, means for mounting the crank in the aperture of the axle, means for urging the crank against the wheel hub, indicating means visible from the operator's compartment, and means connecting the crank and the indicating means.

2. In combination with an airplane having a landing gear and wheels, an axle supporting the wheel and provided with an aperture, a source of electrical energy, electrical indicating means visible from the operator's compartment, an electrical circuit partially housed in said aperture connecting the wheel and axle to the indicating means, said electric circuit including an insulated passage, a plunger slidable in the passage and engaging the inner surface of the wheel, and means including a spring normally urging said plunger into contact with the inner surface of the wheel to discharge the plunger and to break the circuit upon removal of the wheel.

3. In combination with an airplane having a landing gear and wheels, an axle to support the wheel having a bore through a portion thereof and an aperture communicating with the bore and extending to the surface of the axle, a member, means in the aperture mounting said member for movement in a direction transverse to the axle, yielding means urging the member in a direction away from the axle to cause said member to engage the inner periphery of the hub of the wheel when in operative position, indicating means visible from the airplane operator's compartment, and means for operating the indicating means when the member is released when the wheel is out of operative position.

MONTGOMERY W. McCONKEY.
HARRY H. SEMMES.